(12) United States Patent
Miller

(10) Patent No.: US 10,195,106 B2
(45) Date of Patent: Feb. 5, 2019

(54) DEFORMABLE VIBRATORY STIMULATION DEVICE

(71) Applicant: Piri Miller, Bronx, NY (US)

(72) Inventor: Piri Miller, Bronx, NY (US)

( * ) Notice: Subject to any disclaimer, the term of this patent is extended or adjusted under 35 U.S.C. 154(b) by 41 days.

(21) Appl. No.: 15/355,877

(22) Filed: Nov. 18, 2016

(65) Prior Publication Data

US 2017/0143582 A1    May 25, 2017

Related U.S. Application Data

(60) Provisional application No. 62/257,490, filed on Nov. 19, 2015.

(51) Int. Cl.
*A61H 19/00* (2006.01)
*A61H 23/02* (2006.01)

(52) U.S. Cl.
CPC .......... *A61H 19/34* (2013.01); *A61H 19/40* (2013.01); *A61H 23/02* (2013.01); *A61H 2201/0165* (2013.01); *A61H 2201/169* (2013.01); *A61H 2201/1645* (2013.01); *A61H 2201/1695* (2013.01); *A61H 2201/50* (2013.01); *A61H 2201/5097* (2013.01); *C08L 2201/12* (2013.01)

(58) Field of Classification Search
CPC ................. A61H 19/34; A61H 2201/0165
See application file for complete search history.

(56) References Cited

U.S. PATENT DOCUMENTS

| | | | |
|---|---|---|---|
| 7,749,178 B2 | 7/2010 | Inboden et al. | |
| 7,931,605 B2 | 4/2011 | Murison | |
| 2014/0228628 A1* | 8/2014 | De Alva | A61H 19/44 600/38 |

* cited by examiner

*Primary Examiner* — Christine H Matthews
(74) *Attorney, Agent, or Firm* — Buchanan Ingersoll & Rooney P.C.

(57) ABSTRACT

A device for use by a female that includes an external housing, an internal skeleton, and a motorized portion. The external housing is configured to conform to the user's shape and form. The internal skeleton may be deformed by the user as desired. The internal skeleton includes shape-memory properties so that after deformation, the device retains the shape desired by the user. The motorized portion is secured within the external housing so that desired portions of the device receive the majority of the stimulation provided by the motorized portion.

10 Claims, 4 Drawing Sheets

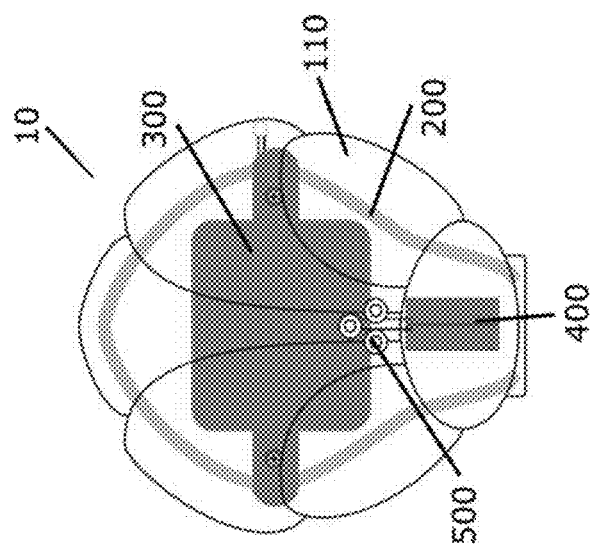
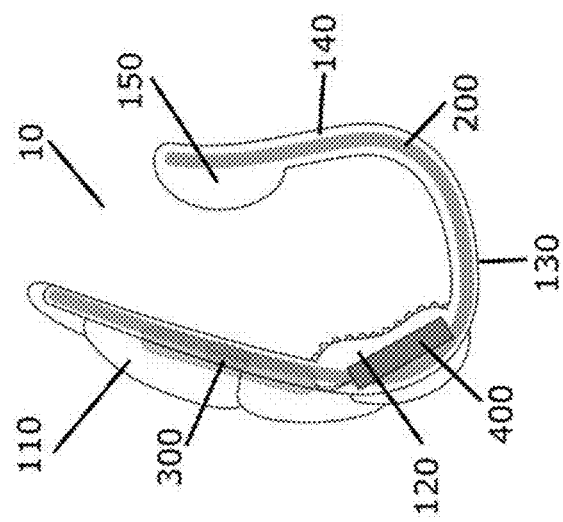
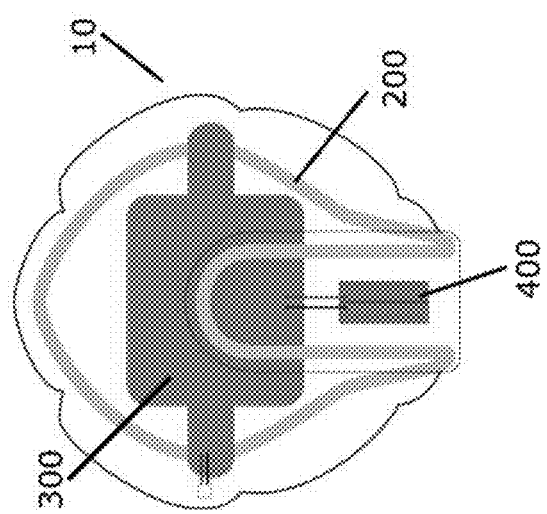

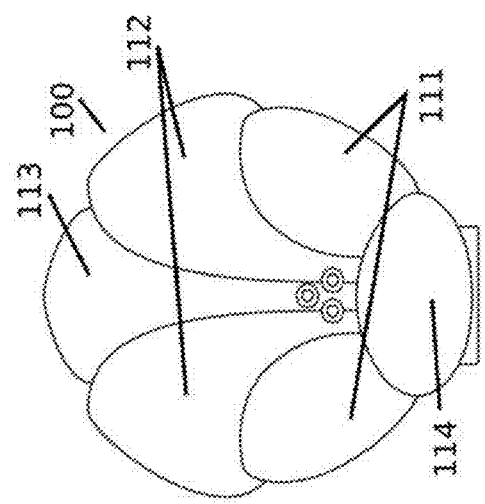
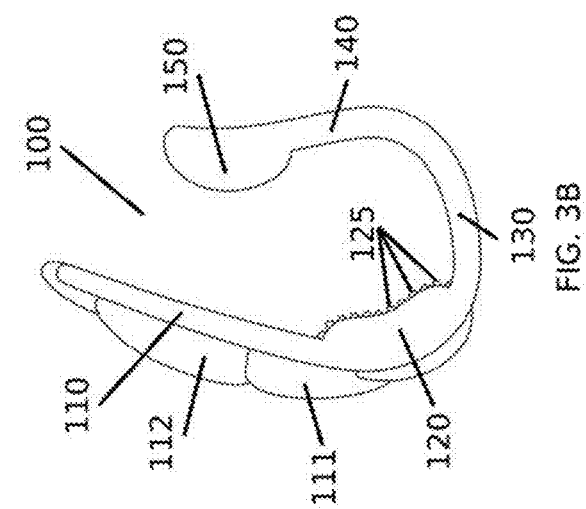
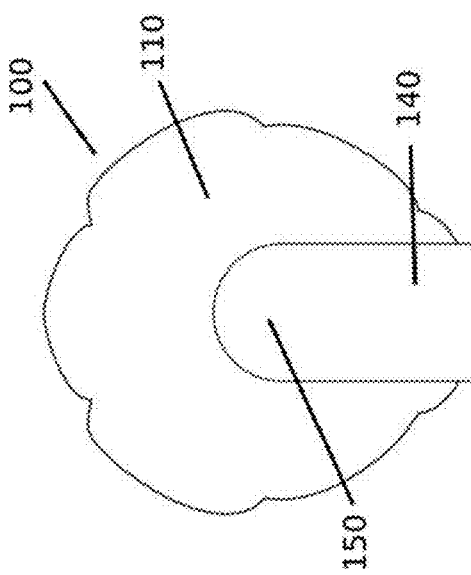

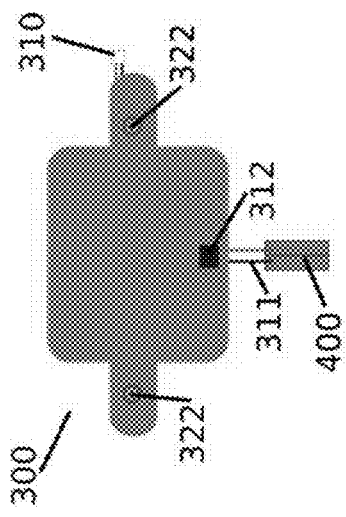
FIG. 4C
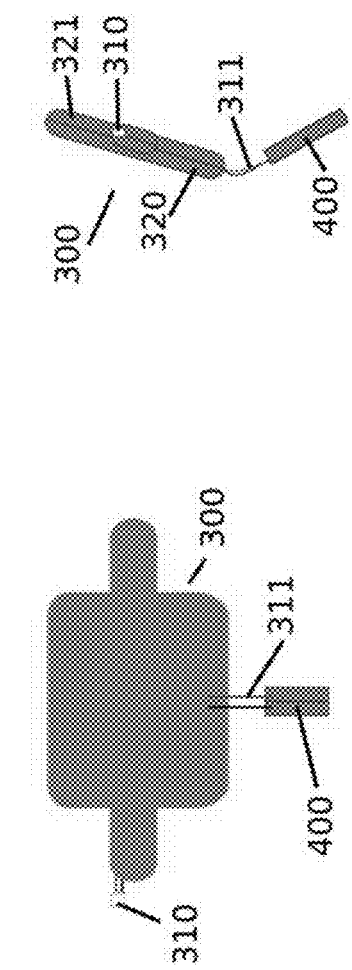
FIG. 4A
FIG. 4B
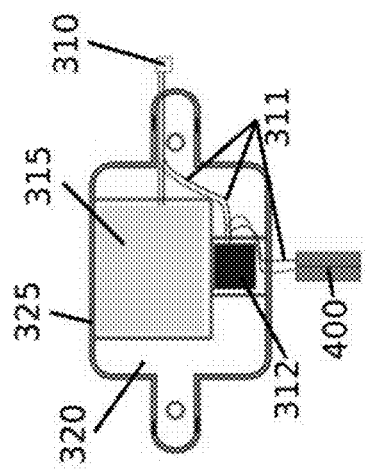
FIG. 4E
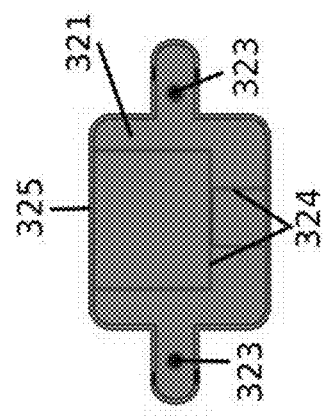
FIG. 4D

DEFORMABLE VIBRATORY STIMULATION DEVICE

TECHNICAL FIELD

The present invention relates to a deformable vibratory stimulation device that directs stimulation to erogenous zones of the female body.

BACKGROUND

Devices exist for use by women to stimulate erogenous zones of their body that are manually operated and that are driven by motors. These devices may also include shapes configured to deliver stimulation to the desired portions of the body. The stimulation may be derived from the movement of the device, the vibration of the device, or a combination of both. Some of these devices have employed shapes like that of a phallus. There is, however, no requirement that such a shape is required to provide the stimulation desired by a user.

In recognition of this, a variety of designs have been employed for both manually operated and motor driven sexual stimulation devices. At least some existing devices that are motor driven are designed to be used without requiring the user to continuously hold the device. These devices may be shaped in a manner where at least a portion of the device is maintained within the user's orifice, e.g., the vagina or anus. These motorized devices typically deliver vibrations to the desired portions of the user's body in addition to undesired portions of the user's body because the entire device experiences the vibration. These conventional designs do not reduce or isolate the vibrations in a manner that helps improve the user's enjoyment. The vibrations that provide the desired stimulation to the user also tend to move the device from the position desired by the user. There therefore exists a need to create a device that retains its position during its operation without requiring adjustment by the user during use.

Known devices that employ motors to provide vibration also tend to indiscriminately deliver vibration to the all portions of the user's body that the device is in contact with. Such indiscriminate vibration may, however, distract from the stimulation provided by the vibration of the device at the desired portions of the body. For example, the vibration of one end of the device may provide the desirable sensations sought by the user whereas the vibration of the other end of the device may provide distracting sensations. The resulting combination of sensations for the user is therefore less than desirable. There therefore also exists a need to create a device that is configured to provide the desired stimulation only at the desired location.

SUMMARY

The present invention is directed to a deformable skeleton for use in a housing of a sexual stimulation device that includes an enlarged portion, a first curved portion, a bridging portion, a second curved portion, and a button supporting portion where the deformable skeleton flexes and maintains the button supporting portion in a position relative to the enlarged portion.

The present invention is also directed to a deformable sexual stimulation device with an external housing with shaped portions positioned to deliver stimulation to portions of a female body where the external housing encloses internal components including a deformable skeleton providing rigidity to the external housing of the device and deforming in a manner so that the shaped portions maintain contact with the portions of the female body, and a motorized portion secured and arranged within the external housing so that vibrations are directed to the shaped portions of the external housing.

DESCRIPTION OF THE FIGURES

FIG. 1A depicts a back view of an embodiment of the sexual stimulation device including selected internal components.

FIG. 1B depicts a side view of an embodiment of the sexual stimulation device including selected internal components.

FIG. 1C depicts a front view of an embodiment of the sexual stimulation device including selected internal components.

FIG. 3A depicts a back view of an embodiment of the housing of the sexual stimulation device.

FIG. 3B depicts a side view of an embodiment of the housing of the sexual stimulation device.

FIG. 3C depicts a front view of an embodiment of the housing of the sexual stimulation device.

FIG. 4A depicts a view of the internal housing and the motorized portion.

FIG. 4B depicts a side view of the internal housing and the motorized portion.

FIG. 4C depicts a view of the side of the internal housing opposite what is depicted in FIG. 4A. This view includes the motorized portion and aspects of the control portion.

FIG. 4D depicts a view of a portion of the internal housing.

FIG. 4E depicts a view of the other portion of the internal housing with selected internal components.

DETAILED DESCRIPTION

Figure 2B:
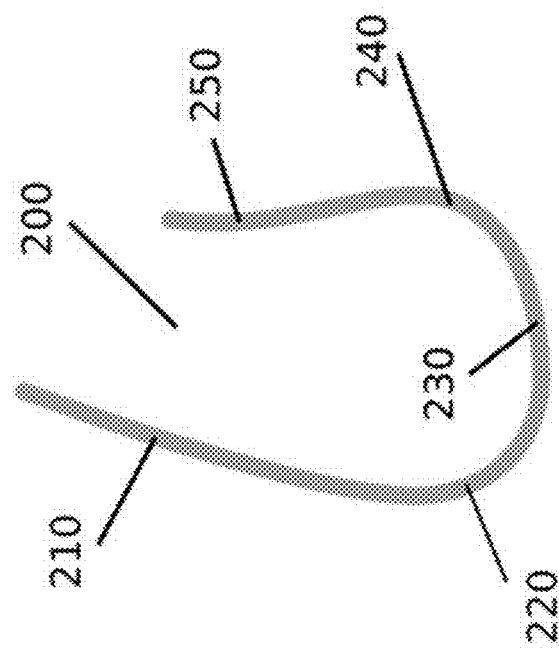
FIG. 2B depicts a side view of an embodiment of the internal skeleton of the sexual stimulation device.

The present invention is directed to a sexual stimulation device that is configured to provide vibratory stimulation to erogenous zones of a user's body. More particularly, the sexual stimulation device 10 is designed to provide vibratory stimulation to at least the clitoral and vaginal areas of a female body.

The sexual stimulation device 10 includes a housing 100 that encloses a plurality of internal components. FIGS. 1A-1C depict views of one embodiment of the sexual stimulation device 10 with views of selected internal components such as the internal skeleton 200, the internal housing 300, and the motorized portion 400. FIGS. 3A-3C depict views of the housing 100 without views of the internal components. Certain components such as the control interface 500 have both internal and external aspects and are accordingly shown in FIGS. 1A-1C and 3A-3C. The internal housing 300 is secured at least to the internal skeleton 200 through the use of fasteners. In some embodiments, the internal housing 300 may be integrally formed with the internal skeleton 200. In other embodiments, the internal housing 300 may be snapped or otherwise secured into position with the internal skeleton 200. Placement of the internal housing 300 does not, however, interfere with the shape-memory effects of the internal skeleton 200 and/or housing 100. The motorized portion 400 is placed in a location spaced from the internal housing 300. Such placement of the motorized portion 400 helps protect components placed on the internal housing 300 from suffering excessive vibration during operation. This placement also helps improve the sensation for the user because the internal skeleton 200 is not directly connected to the motorized portion 400, reducing the amount of vibration that is communicated throughout the sexual stimulation device 10. Other internal components may be included in the sexual stimulation device 10 but are not explicitly shown in the included depictions and following descriptions.

Internal Skeleton

Figure 2A:
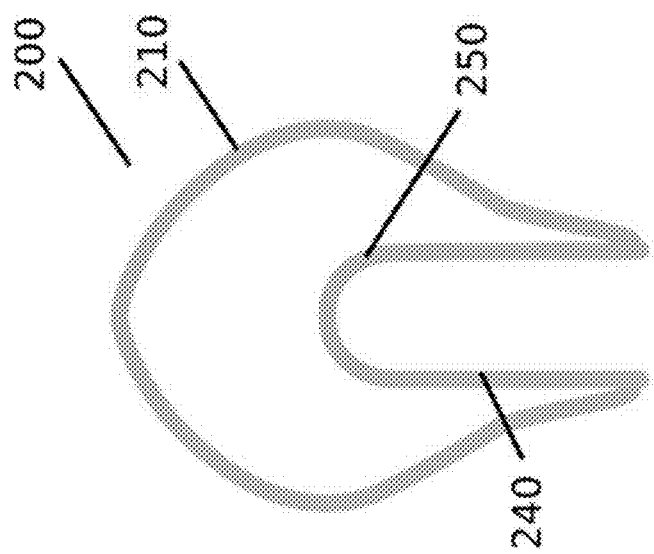
FIG. 2A depicts a back view of an embodiment of the internal skeleton of the sexual stimulation device.

The internal skeleton 200 is provided inside the housing 100 of the sexual stimulation device 10. As shown in the side view of FIG. 1B and the depictions of the internal skeleton 200 in FIGS. 2A-2B, the internal skeleton 200 of the depicted embodiment 10 extends from the external portion 110, through the jellybean-shaped portion 120, through the bridging portion 130, through the securing portion 140, and terminating at the button portion 150. More specifically, as shown in the back view of FIGS. 1A-1C and 2A-2B, the internal skeleton 200 includes an enlarged portion 210 that exists in the external portion 110 of the housing 100, a first curved portion 220 that exists in the jellybean-shaped portion 120 of the housing 100, a bridging portion 230 that exists in the bridging portion 130 of the housing 100, a second curved portion 240 that exists in the securing portion 140 of the housing 100, and the button-supporting portion 250 that exists in the button portion 150 of the housing 100.

The internal skeleton 200 may be secured in the housing 100 through the use of an interference or friction fit or through the use of fasteners or other affixing techniques. Certain embodiments may employ a housing 100 that is on contact with portions with the internal skeleton 200 so that the housing 100 and the internal skeleton 200 deform together and so that the housing 100 and the internal skeleton 200 can maintain the deformation by way of shape-memory. Such deformability and shape-memory help provide a more desirable experience for the user by helping maintain the position of the sexual stimulation device 10 without requiring the user to hold the device 10 and by helping apply the desired stimulation to the desired portions of the user's body.

The internal skeleton 200 provides at least some of the rigidity of the sexual stimulation device 10 and at least some of the shape-memory characteristics of the sexual stimulation device 10. In some embodiments, the internal skeleton 200 provides all of the shape-memory characteristics of the sexual stimulation device 10. The internal skeleton includes the first and second curved portions 220, 240 whose curvature may be adjusted by the user by deforming the sexual stimulation device 10. By adjusting the curvature of the first and second curved portions 220, 240, the user may modify the shape of the sexual stimulation device 10 so that the position of the device 10 is maintained without requiring the user to hold the device 10 and so that the device applies the desired stimulation to the desired portions of the user's body. In some embodiments, at least the curved portions 220, 240 have shape-memory characteristics. In other embodiments, the entirety of the internal skeleton 200 has shape-memory characteristics. In one embodiment, shape-memory materials of various types may be employed. In other embodiments, more conventional materials such as aluminum, copper, and/or nickel-titanium alloys may be employed. A variety of materials may be employed so long as the desired rigidity and desired shape-memory properties exist in the resulting internal skeleton 200, and so long as other required aspects of the internal skeleton 200 are present. In some embodiments, the internal skeleton 200 may include a meshed component that fills the space enclosed by the internal skeleton 200. Such a meshed component may be provided in a manner that supplies additional rigidity to the device 10.

Housing

FIGS. 3A-3C depict one embodiment of the housing 100 for the sexual stimulation device 10. The housing 100 is designed to provide a sealed enclosure for the variety of internal components that comprise the sexual stimulation device 10. The housing 100 is also sufficiently flexible and deformable to allow for deformation by the user into a desired shape. The housing 100 completely encloses the internal components, but other aspects with external portions such as the control interface 500 have components that are exposed. Such exposed components do not compromise the sealed nature of the device 10 due to the use of known sealing techniques. In some embodiments, such a sealed device 10 is water-resistant. In additional embodiments, the sealed device 10 is also resistant to common cleaning agents.

The housing 100 may be made of one material or may be formed of multiple materials. The housing may be formed of one unitary piece, or multiple pieces that are joined together to form the completed device 10. Multiple materials may be employed when different properties are desired for aspects of the device 10. For example, the external portion 110 that rests on the user's vulva may be formed of a material that is different from the button portion 150 which rests inside the user's vagina so that the material optimal for each aspect of the device may be employed. Further, different materials may be used to maximize user comfort and/or stimulation. For example, if textured aspects 125 are employed to maximize stimulation, these textured aspects 125 may be formed of a material that is not the same as the material that is employed for the button portion 150 or the external portion 110. Another reason different materials may be used for portions of the housing 100 is to improve characteristics such as the ability of the device 10 to dissipate heat generated by internal components. For example, portions of the external portion 110 may be partially formed of materials that can dissipate heat more efficiently than other portions of the external portion 110 and/or other portions of the device 10. Another reason different materials may be used for portions of the housing is to provide improved control of vibration. For example, aspects of the housing 100 that are closest to a motorized portion 400, to be described later, may be configured to direct vibrations to desired aspects of the user's body. These same aspects of the housing may also dampen the vibration from the motorized portion 400 so that other aspects of the sealed device are at least somewhat isolated from the vibration from the motorized portion 400. In some embodiments, the motorized portion 400 may be encased in a material harder than the material forming the housing 100 so that vibrations from the motorized portion 400 may be directed and dampened as appropriate. Examples of materials that could be used to form the housing include silicones and plastics of varying hardness, stiffness, and other properties as desired.

Regardless of the particular material or materials used to form a particular embodiment of the device 10, the material or materials provide a sealed enclosure configured to provide pleasurable sensations for the user while protecting internal components of the device 10. The material preferably provides an easily cleaned surface that is not affected by warm and/or soapy water. The material preferably does not absorb any substances it may encounter including bodily fluids, water and/or mild cleaning agents, and a variety of lubricants that may be employed during sexual activities. In some embodiments of the device 10, the housing 100 exhibits certain shape-memory effects so that after the user has deformed the device 10, the device retains the deformed shape so that the device 10 delivers the desired stimulation without changing its position during operation.

The housing 100 includes structures that contribute to the functioning of the device. The external portion 110 is configured to rest comfortably on the user. Embodiments of the sexual stimulation device 10 may employ external portions 110 that rest on the user's vulva. Accordingly the shape of such devices 10 may be configured to rest comfortably on the user's vulva. The shape of the external portion 110 may also slightly deform to conform with the user's body. The external portion 110 provides a large surface portion that, when brought into contact with the user's body, helps reduce the movement of the sexual stimulation device 10 during operation. Some embodiments may include an external portion 110 that is more heavily weighted than other portions of the sexual stimulation device 10 due to the inclusion of internal components.

The jellybean-shaped portion 120 is configured to apply stimulation at least to the user's clitoral area. The jellybean-shaped portion 120 extends inwardly from the inner curve that defines the internal surface of the housing 100. This extension or protrusion from the internal surface of the housing 100 allows the jellybean-shaped portion to provide additional desirable stimulation to the user's clitoral area. Certain embodiments including the embodiment shown in FIGS. 3A-3C may also employ textured components 125 to further enhance the desirable stimulation being applied to the user's clitoral area. Other aspects of the housing 100 may also include textured components such as the button portion 150. The textured portions may have any type of pattern that provides the desired stimulation to the user. The pattern for the textured portions could be symmetrical, asymmetrical, or arranged in any manner which provides the desired stimulation to the user. The jellybean-shaped portion 120 is flexible and deforms with the first curved portion 210 of the internal skeleton so that the jellybean-shaped portion 120 provides simulation to the user's clitoral area.

The bridging portion 130 extends form the jellybean-shaped portion 120 towards a securing portion 140. The bridging and securing portions 130, 140 have a substantially smooth inner surface that is designed to conform to the user's individual shape. The inner surface is pressed against the user's body and the device 10 is deformed so that this positioning by the user is maintained without requiring the user to continuously hold the device 10. At least a portion of the bridging and securing portions 130, 140 extends into the user's vagina so both the inner and outer surfaces of the bridging and securing portions 130, 140 are tailored for such usage. For example, the inner and outer surfaces of the bridging and securing portions 130, 140 do not include sharp or abrupt edges that might cause discomfort in the user. The bridging and securing portion 130, 140 are flexible and deform, in conjunction with the second curved portion 240 of the internal skeleton 200 so that the button portion 150 rests near or at a sensitive portion of the user's vagina such as the G-spot.

The housing 100 may include ornamental aspects along with functional aspects. Outer surfaces of aspects such as the external portion 110 could contribute to the aesthetics of the device. These same ornamental aspects may also provide beneficial functions imparted by their structure. For example, ornamental aspects 111, 112, 113, 114 shown in FIGS. 3B and 3C provide a gripping surface for the user while simultaneously contributing to the overall aesthetics of the device 10. FIGS. 3A-3C also illustrates how the depicted embodiments have other aspects of the housing 100 such as the bridging portion 130, securing portion 140, and button portion 150 that do not include such surface features. Surface features that do not interfere with the function requirements of the bridging portion 130, securing portion 140, and button portion 150.

Internal Housing and Selected Internal Components

The housing 100 encloses internal components including the internal skeleton 200, internal housing 300, the motorized portion 400, and at least a portion of the control interface 500. The internal housing 300 and selected components enclosed by the internal housing 300 are shown in FIGS. 4A-4E. When sealed, the internal housing 300 includes wiring 311 that connects the various internal components and the motorized portion 400. In the embodiments depicted in FIGS. 4A-4E, aspects of the wiring lead to a charging plug 310 that extends from the internal housing 300 so that external power may be supplied to a rechargeable internal power source 315. The internal housing 300 is formed by two separate portions 320, 321 that are joined to form the internal housing 300. The two separate portions 320, 321 of the internal housing 300 may include channels 325 that are shaped to fit with each other. In some embodiments, the fit between the channels 325 is such that the internal housing 300 is at least partially water-resistant. The channels 325 ensure that the portions 320, 321 do not accidentally become separated. Fasteners 322 may also be used in certain embodiments and inserted into apertures 323 so that the portions 320, 321 are securely joined to each other. In some embodiments, the fasteners 322 may instead secure the internal housing 300 to the internal skeleton 200. In some embodiments, both features may be simultaneously provided by the fasteners 322.

The portions 320, 321 of the internal housing 300 may also include internal structures 324 that are designed to help secure internal components, such as the internal power source 315, an internal control mechanism 312, and internal wiring 311. These internal structures 324 help ensure that internal components do not become misaligned or misplaced. For example, FIG. 4E shows how internal structures 324 help secure the internal power source 315 and the internal control mechanism 312. In some embodiments, such as those shown in FIGS. 4D and 4E, the internal structures 324 may have corresponding structures on each portion 320, 321 of the internal housing 300. Other structural components are not depicted and may include wireless communications modules such as a Bluetooth communications module for transmitting information and receiving commands from the user, sealing components such as additional seals or gaskets. In some embodiments, the internal control mechanism 312 may include these additional components. In other embodiments, separate components are used and wired to each other either on a printed circuit board. For example, the internal control mechanism 312 may include external components such as a control interface 500, or the internal control mechanism 312 may be mounted on a printed circuit board with the control interface 500. Those of ordinary skill in the art also recognize that the internal control mechanism 312 may be connected to the control interface by wiring 311.

The internal power source 315 may be any suitable rechargeable power source that provides the desired power levels without generating excessive heat or other undesirable effects during operation. For example, the internal power source 315 may be a lithium-ion battery. The charging plug 310 may also be used to directly power internal components if the internal power source 315 is at a level insufficient to drive the internal components. In some embodiments, other charging techniques may be employed including inductive charging or capacitive coupling. Such charging techniques that do not rely on plugs or other components that require an opening in the internal housing 300 are particularly advantageous because it improves the sealing of the housing 100 and reduces the possibility of damage to wires and other exposed components.

Control Interface and Internal Control Mechanism

The internal control mechanism 312 include processing capabilities to interpret user commands received from the control interface 500 and control the motorized portion 400 to provide the desired stimulation. In some embodiments the internal control mechanism 312 may manage other aspects of the device 10 such as the recharging state of the internal power source 315 or communicating with an external device through a wireless communications module. The internal control mechanism 312 of the device 10 described by this application can at least control the powered state of the device 10 and provide the control signals to modulate the motorized portion 400 in at least one pattern. The internal control mechanism 312 may regulate aspects such as the operational duration or intensity of the device 10 to prevent discomfort or injury to the user that may result from the heat generated through prolonged operation of the device 10.

In some embodiments, the user may define additional patterns for the motorized portion 400. The user may define such a pattern through the control interface 500 or through a remote device controlling the device 10 through a wireless communications module. In such embodiments, the internal control mechanism 312 stores the patterns for selection and use by the user as desired. The internal control mechanism 312 may also control the motorized portion 400 with a dynamic pattern. In such a configuration, the internal control mechanism 312 activates the motorized portion 400 in response to a pattern that is being generated by the internal control mechanism 312 through random or pseudo-random techniques, or being generated by the internal control mechanism 312 in response to remote stimuli such as a user's command on a remote device such as a smartphone or other device.

The control interface 500 provides a portion of the device 10 that the user may use to interact with the device 10. The control interface 500 includes an activation portion for activating the device 10. The control interface 500 may include an input portion where the user may select an operation mode. The control interface 500 may include a feedback portion where the user may receive feedback as to the current state of the device. The feedback portion may comprise optical aspects such as LEDs, tactile aspects such as a raised or depressed buttons, and/or audible aspects such as sounds that are emitted. The current state of the device may include any of the following: the powered state of the device 10, e.g., whether the device is on or off; an operational mode, e.g., a vibratory mode for the device; a stored energy state of the device 10, e.g., the amount of energy remaining in the device power source and/or if the device is fully charged and/or uncharged. Other states of the device may be provided to the user and the preceding list should not be considered to be an exhaustive list.

The wireless communications module may operate in conjunction with the remainder of the internal control mechanism 312 to allow the user to more particularly customize the operation of the device 10. This is desirable because the device 10 has limited surface area that may be dedicated to a control interface 500. By employing a wireless communication module, the device 10 may utilize the interface of a different device such as a smartphone or other device. The wireless communication module uses short-ranged protocols such as Bluetooth, longer-ranged protocols such as IEEE 802.11, or a combination of protocols. The internal control mechanism 312 may include an application programming interface (API) that allows the different device to control different aspects of the device 10. The API allows for the different device to control all aspects of operation of the device and also allows for the collection of operational information such as the battery status. In some embodiments, the API may be used to dynamically control the pattern of stimuli, as described above.

Motorized Portion

The motorized portion 400 of the device 10 provides the desirable vibrations sought by the user. The motorized portion 400 includes at least one motor that provides the needed movement. Some embodiments of the device 10 includes a motorized portion 400 that can respond to commands from the internal control mechanism 312 so that patterns of vibration may be experienced by the user. Such a motorized portion 400 can provide the user a pattern customized to their preferences. Certain motorized portions 400 may also allow for variations in the strength of the vibrations being provided to the user. The motorized portions 400 are controlled and powered by the internal components of the device 10.

The motorized portion 400 includes at least one motor that provides the stimulation desired by the user. Vibrating or phasing motors are examples of such motors. Some embodiments of the device 10 include a motorized portion 400 with two or more motors. Such embodiments with two motors can vary the vibrations of each motor either simultaneously or separately. When multiple motors are employed, certain embodiments of the device 10 may utilize different types of motors so more directed vibrations or types of movement are possible. Other advantages may include improved power efficiency and the ability to modify the strength of the vibrations in a more precise manner. Embodiments that allow for variations in the vibrations for each motor are particularly suitable for customized vibration patterns that are defined by the user.

Regardless of the specific configuration of the motorized portion 400, an advantageous aspect of the device 10 described by this application is that the vibrations delivered by the motorized portion 400 do not cause unwanted vibrations in other aspects of the device. One reason this is possible since the motorized portion 400 is not secured to the internal skeleton 200 or other internal components of the device 10. FIGS. 1A-1C illustrate how one embodiment spaces the motorized portion 400 from other internal components such as the internal skeleton 200 and the internal housing 300.

More particularly, the motorized portion 400 is secured within the housing 100 in a manner that directs the vibrations to the jellybean-shaped portion 120 and the button portion 150 while also isolating undesirable vibrations in the remainder of the device 10. For example, vibrations of the external portion 110 of the housing 100 are not desirable so the embodiments of the device 10 described here seek to prevent such vibrations. To achieve this result, some embodiments of the device 10 include cavities in the housing 100 that are filled with dampening materials such as gels or foams to dampen unwanted vibrations and direct desirable vibrations. In other embodiments of the device 10, structural aspects of the housing 100 help damped unwanted vibrations and direct desirable vibrations. Various structures may be configured to secure the motorized portion 400 as well so that the desirable vibrations are directed to the jellybean-shaped portion 120 and the button portion 150. For example, a structure may interface with the motorized portion 400 so that vibrations are transmitted to the button portion 150 and the jellybean-shaped portion 120. In some embodiments, the motorized portion 400 may be comprised of multiple motors distributed throughout the device 10 to provide highly localized and directed vibrations. For example, a separate motor may be incorporated in a manner so that it solely provides the vibration for the button portion 150, and a separate motor may be incorporated in a manner so that it solely provides the vibration for the jellybean-shaped portion 120. In some embodiments, the motorized portion 400 may be encased in a material with a higher hardness than the surrounding material such as the external housing 100. By encasing the motorized portion 400 in such a manner, unwanted vibrations can be minimized and the desired vibrations may be more properly directed to aspects of the user's body.

Various combinations of these techniques may be employed to achieve the desired result of providing the desired stimulation to the appropriate portions of the user's body while reducing the undesirable stimulation.

One advantageous feature of the disclosed device 10 is the ability to apply the desired stimulation to portions of the user's body without requiring the user to constantly hold and maintain the position of the device 10 relative to the user's body. The sexual stimulation device 10 described here includes shape-memory effects to achieve this feature even when the device is delivering vibrations and other stimuli to the user. Another advantageous feature of the disclosed sexual stimulation device 10 is the ability to reduce the amount of undesired stimuli being applied to user's body. The sexual stimulation device 10 here achieves this by directing the actuations provided by the motorized portion 400. These and other advantages arise from the features described and depicted herein. Modifications of the present invention may be made without regard to the specifics described above without departing from the inventive concepts contained herein.

What is claimed is:

1. A deformable skeleton for use in a housing of a sexual stimulation device, the skeleton comprising:
    an enlarged portion, a first curved portion, a bridging portion, a second curved portion, and a button-supporting portion;
    wherein the enlarged portion is spaced from the button-supporting portion by the first curved portion, the bridging portion, and the second curved portion;
    wherein the first and second curved portions are formed of resilient materials;
    wherein the first and second curved portions are configured to bias the button-supporting portion of the deformable skeleton and a button portion of the housing into resilient contact with an internal portion of a female body; and
    wherein the deformable skeleton flexes and maintains the button-supporting portion in a position relative to the enlarged portion.

2. The deformable skeleton of claim 1, wherein the deformable skeleton includes portions for securing an internal housing separate from a motorized portion of the sexual stimulation device.

3. The deformable skeleton of claim 1, wherein a motorized portion of the sexual stimulation device is isolated from contact with the deformable skeleton.

4. A deformable sexual stimulation device comprising:
    an external housing with shaped portions positioned to deliver stimulation to portions of a female body, the shaped portions comprising:
        a button portion configured to deliver vibrations to an internal portion of the female body;
    the external housing enclosing internal components comprising:
        a deformable skeleton providing rigidity to the external housing of the device and deforming in a manner so that the shaped portions maintain contact with the portions of the female body, the deformable skeleton comprising:
            an enlarged portion spaced from a button-supporting portion by a first curved portion, a bridging portion, and a second curved portion;
            wherein the first and second curved portions are formed of resilient materials;
            wherein the first and second curved portions are configured to bias the button-supporting portion of the deformable skeleton and a button portion of the external housing into resilient contact with the internal portion of the female body; and
        a motorized portion secured and arranged within the external housing so that vibrations are directed to the shaped portions of the external housing.

5. The sexual stimulation device of claim 4, wherein the deformable skeleton includes portions for securing an internal housing separate from the motorized portion.

6. The sexual stimulation device of claim 4, wherein the shaped portions of the external housing further comprise a jellybean-shaped portion.

7. The sexual stimulation device of claim 6, wherein the jellybean-shaped portion and the button portion include textured aspects.

8. The sexual stimulation device of claim 6, wherein the deformable skeleton is configured to flex and maintain the jellybean-shaped portion in contact with the portions of the female body.

9. The sexual stimulation device of claim 6, wherein the deformable skeleton is configured to flex and maintain both the button portion and the jellybean-shaped portion in contact with the portions of the female body.

10. The sexual stimulation device of claim 4, wherein the motorized portion is placed in a dampening material.

* * * * *